(12) United States Patent
Horvath et al.

(10) Patent No.: US 6,571,884 B1
(45) Date of Patent: Jun. 3, 2003

(54) QUICK CHANGE SWEEP RETAINER

(75) Inventors: Leonard Horvath, St. Brieux (CA); Linus Yeager, St. Brieux (CA); Ricky William Schemenauer, St. Brieux (CA)

(73) Assignee: F. P. Bourgault Tillage Tools Ltd., St. Brieux (CA)

( * ) Notice: Subject to any disclaimer, the term of this patent is extended or adjusted under 35 U.S.C. 154(b) by 0 days.

(21) Appl. No.: 10/089,957
(22) PCT Filed: Sep. 28, 2000
(86) PCT No.: PCT/CA00/01117

§ 371 (c)(1),
(2), (4) Date: Apr. 4, 2002

(87) PCT Pub. No.: WO01/24603
PCT Pub. Date: Apr. 12, 2001

(30) Foreign Application Priority Data

Oct. 4, 1999 (CA) .............................................. 2284457

(51) Int. Cl.[7] .............................................. A01B 35/22
(52) U.S. Cl. ....................... 172/730; 172/750; 172/762; 403/109.3; 403/322.2; 403/325; 403/327; 403/379.5; 403/388; 403/408.1; 403/DIG. 4; 403/DIG. 6
(58) Field of Search ................................ 172/730, 750, 172/762, 749, 681; 403/80, 83, 84, 93, 92, 101, 109.3, 109.2, 109.1, 109.6, 109.8, 315, 322.2, 321, 325, 326, 327, 335, 338, 341, 375, 376–378, 379.5, 380, 388, 408.1, DIG. 4, DIG. 6, DIG. 14, DIG. 11

(56) References Cited

U.S. PATENT DOCUMENTS

| | | | |
|---|---|---|---|
| 1,443,835 A | 1/1923 | Buikema | |
| 2,258,932 A | 10/1941 | Jacobs | |
| 2,908,340 A | 10/1959 | Love et al. | 172/762 |
| 3,041,752 A | 7/1962 | Evans | 37/142 |
| 3,061,021 A | 10/1962 | Shader | 172/750 |
| 3,220,489 A | 11/1965 | Repka | 172/750 |
| 3,563,318 A | 2/1971 | Eberhardt | 172/750 |
| 4,611,418 A | 9/1986 | Launder | 37/141 |
| 5,007,484 A | 4/1991 | Johanson | 172/1 |
| 5,711,378 A | 1/1998 | Yeager | 172/730 |

Primary Examiner—Christopher J. Novosad
(74) Attorney, Agent, or Firm—Michael Best & Friedrich LLP

(57) ABSTRACT

A novel solution for changing sweeps or knives on a cultivator or other soil working tool is the subject matter of the present invention. In today's farming world, where labor is at a premium and time is of the essence, a sole operator or farmer in preparing the fields for planting, summer fallow or other operations will sometimes need to change the sweeps or knives which till the ground several times for different crops or operations. The novel invention herein provides for an apparatus for quickly removing the sweeps (2) on cultivator shanks and replacing them with other soil openers of different width or configuration. A simple press button (7) releases the sweep (2) from an adapter bolted to a standard cultivator shank. The present invention eliminates the problem of sweeps falling off shanks due to lack of friction or difficulty in removing sweeps because of over friction.

13 Claims, 6 Drawing Sheets

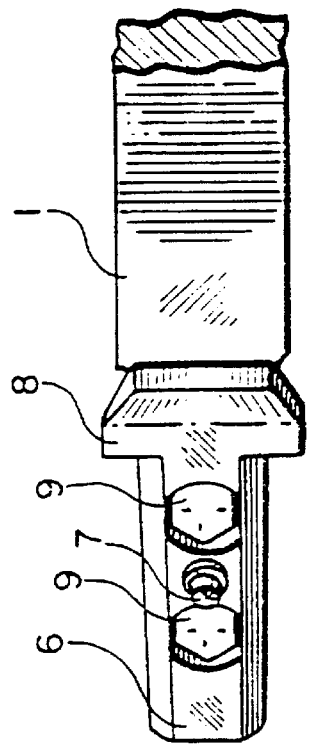
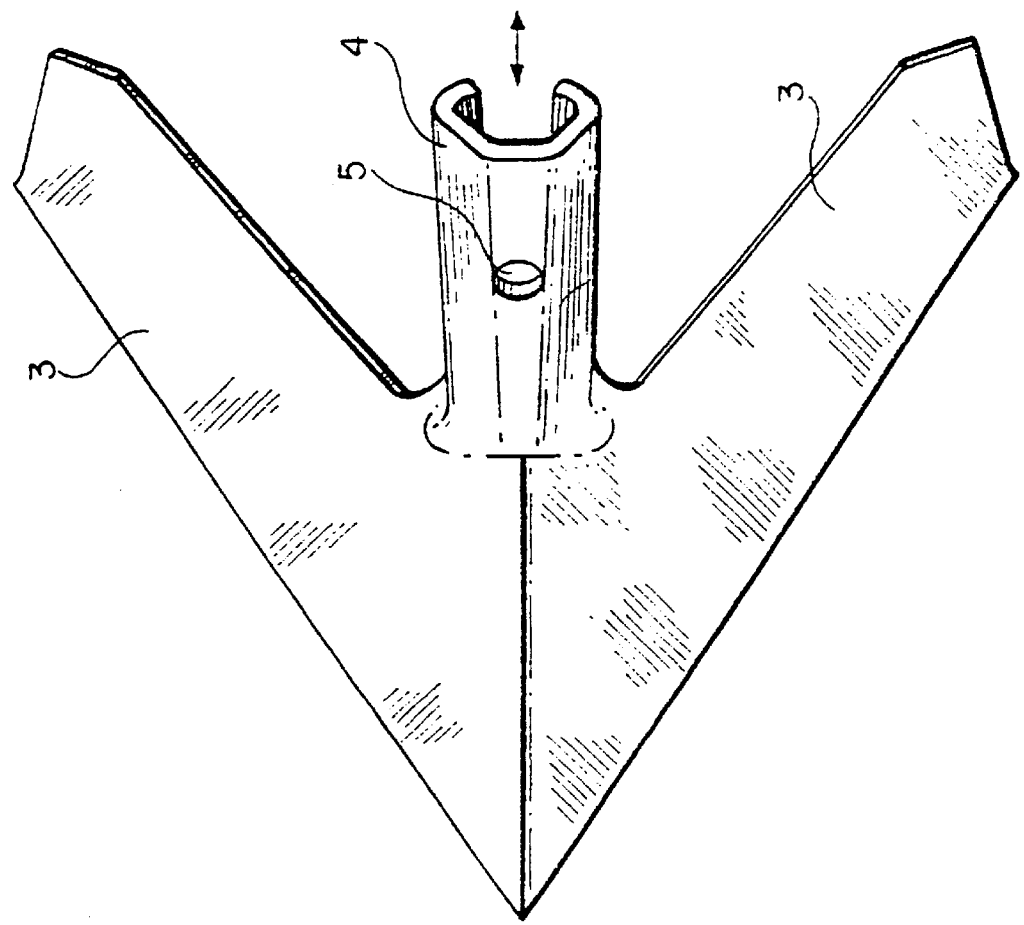
Fig. 1

QUICK CHANGE SWEEP RETAINER

FIELD OF INVENTION

This invention relates to soil working tools for agriculture. More particularly, this invention relates to an apparatus and method of removing and replacing soil openers on the shanks of an agricultural soil working implement such as a cultivator, an air drill or a chisel plow.

BACKGROUND

In today's farms a standard implement to disturb the soil for cultivating is a framed cultivator implement generally supported by wheels and pulled by a substantial power source such as a four wheel drive tractor. A standard cultivator generally is equipped with a substantially horizontal frame which a number of cross members positioned transverse to the direction of travel. Located on the cross-members are a plurality of standard curved steel shanks which extend downwardly. The shanks are generally equipped with a pair of apertures so that the soil working tools can be bolted onto such shanks.

Soil working tools can be openers, knives or sweeps depending upon the operation. The soil working tools generally have a shorter life than the cultivator due to the constant contact with rocks and other obstacles in the field. Thus, these must be changed from time to time. In addition, new types of farming require different sizes of furrows or trenches cut in the ground by such earth working tools. For example in zero tillage operations only a narrow furrow need be cut into the stubble and seed placed therein. In other cases a wider trench may be necessary or in cases of summer fallow or reseeding, for instance a hay field, the entire ground must be turned over in preparation for crop planting.

Typically when a farmer replaces the soil openers or changes soil openers to a different type, it is necessary to unbolt each one of the soil openers, such bolts often becoming rusty and extremely hard to remove. This is a very time consuming operation and can take as long as a couple of days depending upon the number of soil working tools which have to be removed and then replaced by removing nuts and bolts.

More recently, a type of adapter is bolted to the shank of the cultivator and the soil working tool having a shank of configuration similar to the adapter is hammered on by friction and hammered off by friction due to the tapered nature of the mating surfaces. This solution, although much improved from the former method still has several drawbacks. For example, soil working tools could slide of the adapter in the fields. In other cases, the amount of force required to remove such soil working tool is immense and problems are encountered trying to remove the soil working tools without damaging the shanks or adapters.

Thus, a need still exists for an easy method of removing and replacing soil working tools on the shanks of cultivators and ensuring that they are locked in place.

PRIOR ART

The concept of removing and replacing earth working tools from machinery is not new. For example, in U.S. Pat. No. 4,611,418, a trenching machine had a large rotating wheel coupled to the bucket. The bucket is coupled to tapered nose pieces and digging points are placed on the nose pieces. The configuration of a machine, however, is not compatible with agriculture seeding and planting. In U.S. Pat. No. 4,611,418, a blocking member is encased in a flexible ceiling member.

In U.S. Pat. No. 3,041,752, teeth are located on the buckets of wheels. Next to the bucket, is a pocket member within which the tooth fits. There is also a coiled spring in a slot which by friction, has a means for resiliently biasing the upper face of the tooth shank (3) into tight frictional engagement with the top face (6b) of slot (6). A pin must be removed prior to removal of the spring and tooth.

In U.S. Pat. No. 3,061,021 a "Cultivator" tool support or holder has a socket in which the shank or the tang of the cultivator shovel is inserted and automatically releasably locked in the operating position. The patent uses a leaf spring with a recess on top of the shank.

In U.S. Pat. No. 3,220,488, the patent discloses an elongated depending cultivator shank having a sweep which includes an elongate tongue. A cultivator shank includes a pair of depending elongated side walls. The patent uses a pivoted latch member, pivot pins, locking doves and expansion springs.

In U.S. Pat. No. 2,908,340 the cultivator shank is equipped with pins and locking arms. The locking arms have lips or slots. There is a plurality of key hole openings and a plurality of locking arms pivotally connected.

U.S. Pat. No. 5,007,484 describes a soil cultivator with a plow or sweep being held to the shank by a movable snap action lock. The shank of the sweep is a pair of C-shaped sections having open sides which face one another. The sweep fits directly on the working end of the shank of the cultivator. A sheet metal clip is used. All forces are transmitted directly from the shank of the cultivator abutment end to a blade stop 52.

SUMMARY OF THE INVENTION

The Inventors of the present invention have made an improvement over the prior art devices which has proved to be simple to manufacture and very adaptable. By using an adapter for the quick release device, a standard cultivator can either be used with the adapter and quick release mechanism of the present invention or can be returned to normal use having tools bolted thereon. Thus the present invention, through the use of the unique adapter can be used on any cultivator currently in the market place.

The adapter of the present invention is somewhat T-shaped having a head and a lower shank. It has two large apertures which permit it to be bolted permanently to the shank of a cultivator. From an end view, the adapter has a flat top and a flat bottom, in cross section. It has a pair of downwardly tapered sides which meet upwardly tapered sides.

The adapter has a type of T-shaped head, such that when the C-shaped hollow shaft of the soil working tool, having a similar configuration to the cross section of the adapter is moved upwardly and onto the adapter, the extending flanges of the head prevent the shank of the soil working tool from moving any further outwardly. In the middle of the adapter is a detent adapter aperture into which is placed a filler plug. A resilient ball keeps upward pressure on the detent which is housed within the filler plug.

In a different embodiment the adapter is equipped with a longitudinal slot on its topside which extends from the top of the head of the adapter to the upper bolt aperture. This is a provision for a removal tool slot engagement point. The removal tool in this embodiment facilitates the depression of the detent and consequent removal of the shank of the sweep or soil working tool.

The sweep, knife, or soil working tool, is equipped with a type of U-shaped upper shank, having an open bottom side and an aperture through the mid section of the shank. The inner sides of the U-shaped shank is of the same configuration as the outer sides of the adapter shank and thus can move easily upwardly without a great deal of friction. The aperture in the shank is adapted to receive the detent in the locked position.

Therefore, this invention seeks to provide a quick change soil working assembly adapted for use with an agricultural soil working implement; said assembly comprising an adapter and a soil working tool; said adapter being configured to be fixedly attached in operation to a mounting shank on said implement; said adapter including a shank and a head; said adapter shank having a cross-section adapted to matingly engage said soil working tool; said adapter shank including a pair of a bolt apertures, a detent aperture, and a resiliently biased detent assembly; said detent assembly including a resilient means, a detent aperture filler plug, and a detent; said soil working tool, including a soil working portion and an elongate holder; said holder including a pair of side flanges with an inner cross section adapted in operation to matingly engage said adapter shank; said holder further including a detent receiving aperture; whereby, in operation, when said holder is moved longitudinally onto a mounted position on said adapter shank, said detent means registers with said aperture whereupon said resilient means moves said detent into said detent receiving aperture to lock said soil working tool in place; and when said detent is pressed downwardly said holder may be moved longitudinally of said adapter shaft to detach said soil working tool.

The invention further seeks to provide a quick change soil working assembly wherein an adapter includes a longitudinal recess on the top side thereof, said recess being adapted to receive a curved end of a removal tool.

BRIEF DESCRIPTION OF THE DRAWINGS

The invention will be described in greater detail in conjunction with the following drawings:

FIG. 1 is a top perspective view of the major components of the invention;

DETAILED DESCRIPTION OF THE INVENTION

Figure 2:
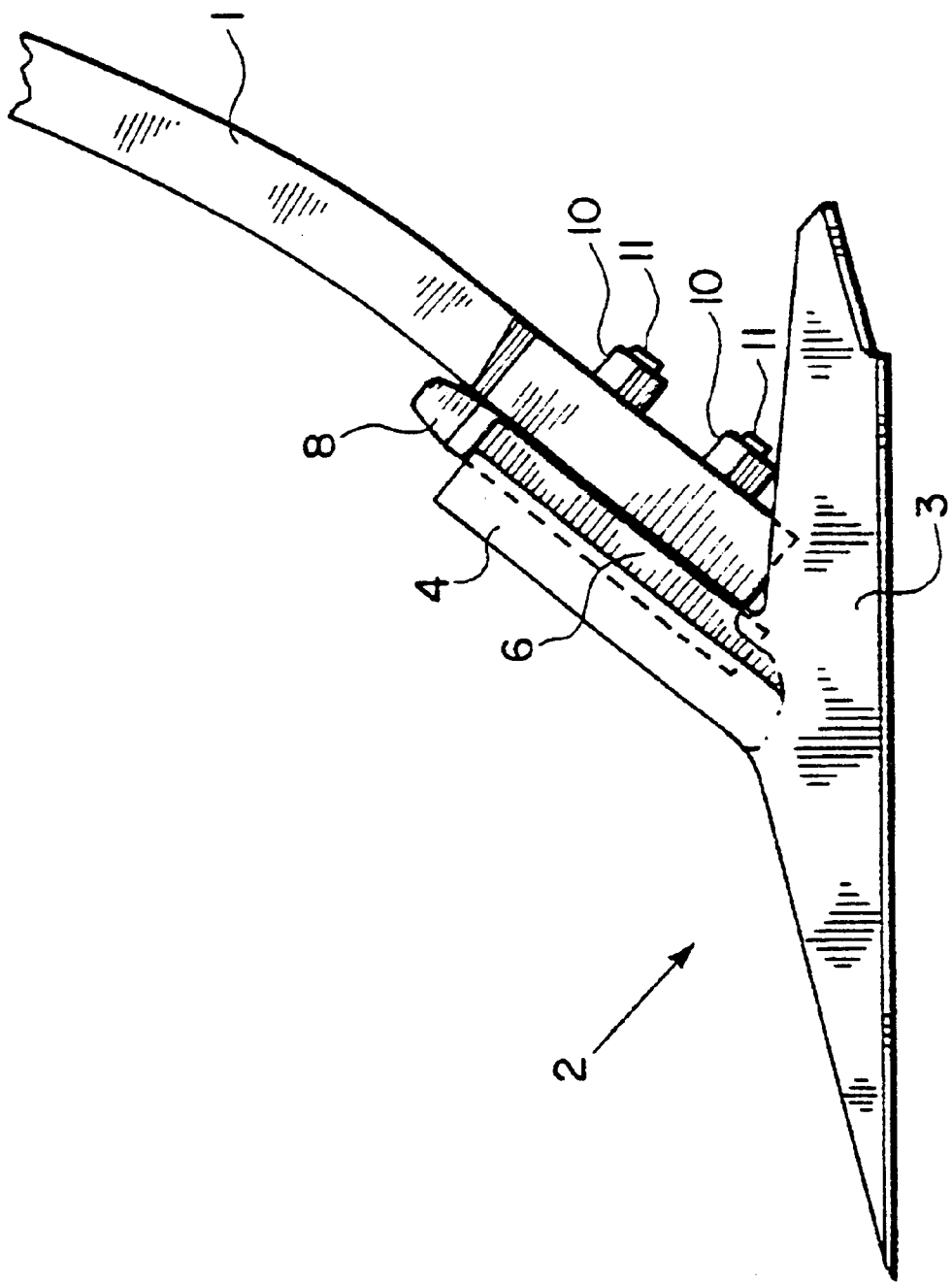
FIG. 2 is a side view of the components of the present invention in a working position.

FIG. 1 is a cut away portion of the working end of a shank 1 of a typical cultivator. Shank 1 is typically bolted at its upper end (not seen) to a cultivator cross member. A sweep or soil opener is shown generally as (2) (see FIG. 2). It has a pair of knife blades extending outwardly and marked as (3). The soil opener (2) is integral with the soil opener holder (4).

As seen in FIG. 1, the holder (4) is hollow and has an inner configuration which could be best described as irregular. It has an open underside. The holder (4) also has an aperture (5). Also in FIG. 1, the view of the adapter is shown having a shank (6) and a T-shaped head (8). The shank (6) and the head (8) form a somewhat T-shaped structured adapter. The adapter has a pair of apertures (9) located on each side of the detent (7). As is evident in FIGS. 1 and 3, the shank (6) tapers in size away from the T-shaped head (8), and the holder (4) has a matching taper.

In FIG. 2, the soil opener or knife (2) is mounted on the adapter shank (6). One notes the shoulders of the head (8) of the adapter abut against the upper part of the holder (4) of the soil opener (2), and in this position the taper surface of the adapter shank (6) lays in intimate contact with the matching tapered surface of the interior of the holder (4). The shank (1) of the cultivator has been bolted to the adapter shank (6) by means of bolts (11) and nuts (10).

Figure 3:
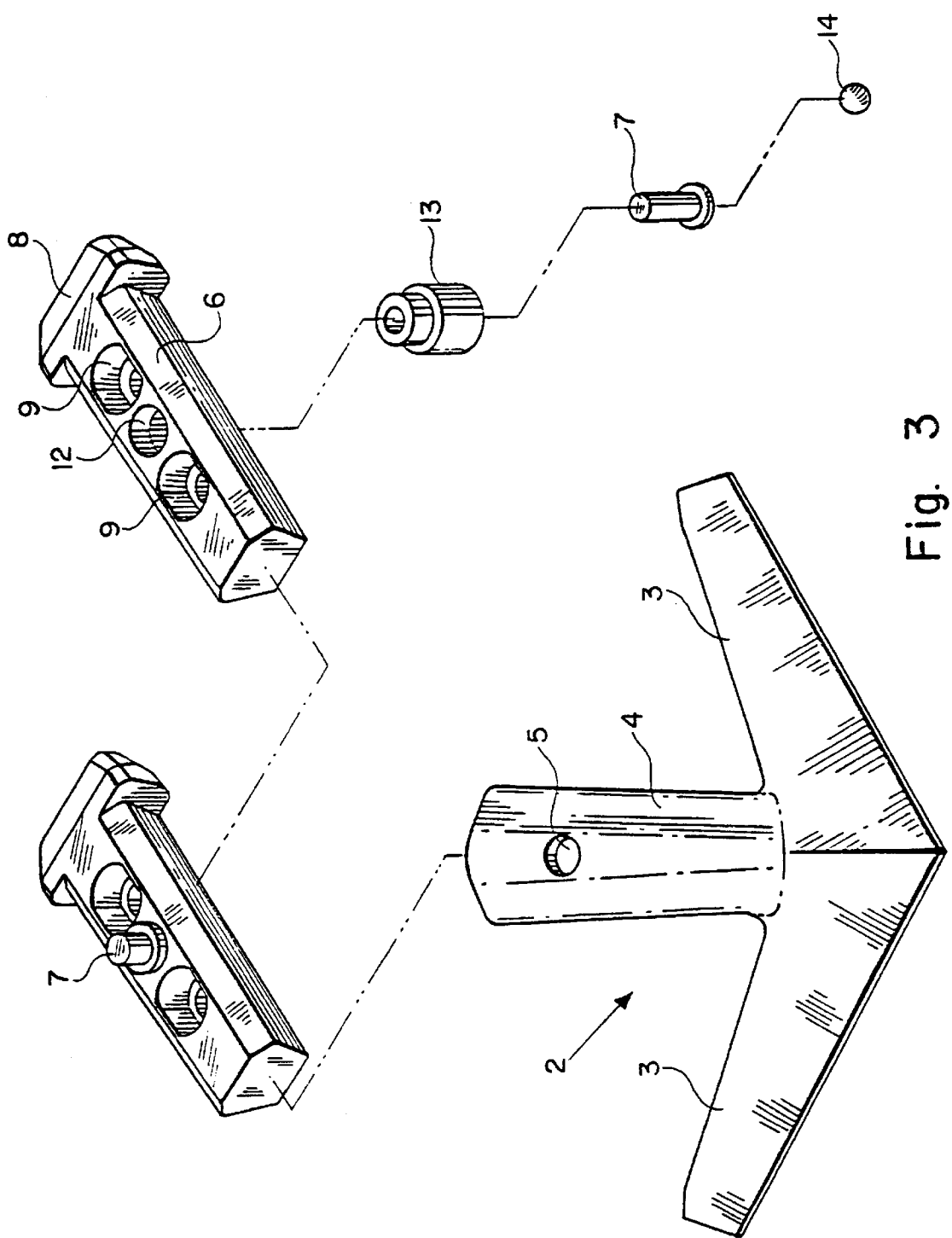
FIG. 3 is an exploded view of the various components of the present invention.

In FIG. 3 the basic components of the spring loaded detent (7) are shown. Aperture (12) is located between the bolt apertures (9). A filler plug (13) is pressed upwardly into aperture (12). The detent (7) is placed in filler plug (13) and an elastic ball (14) or other resilient means is placed in filler plug (13). When the adapter shank (6) is bolted onto a cultivator shank ball (14) is secured in place.

Figure 4:
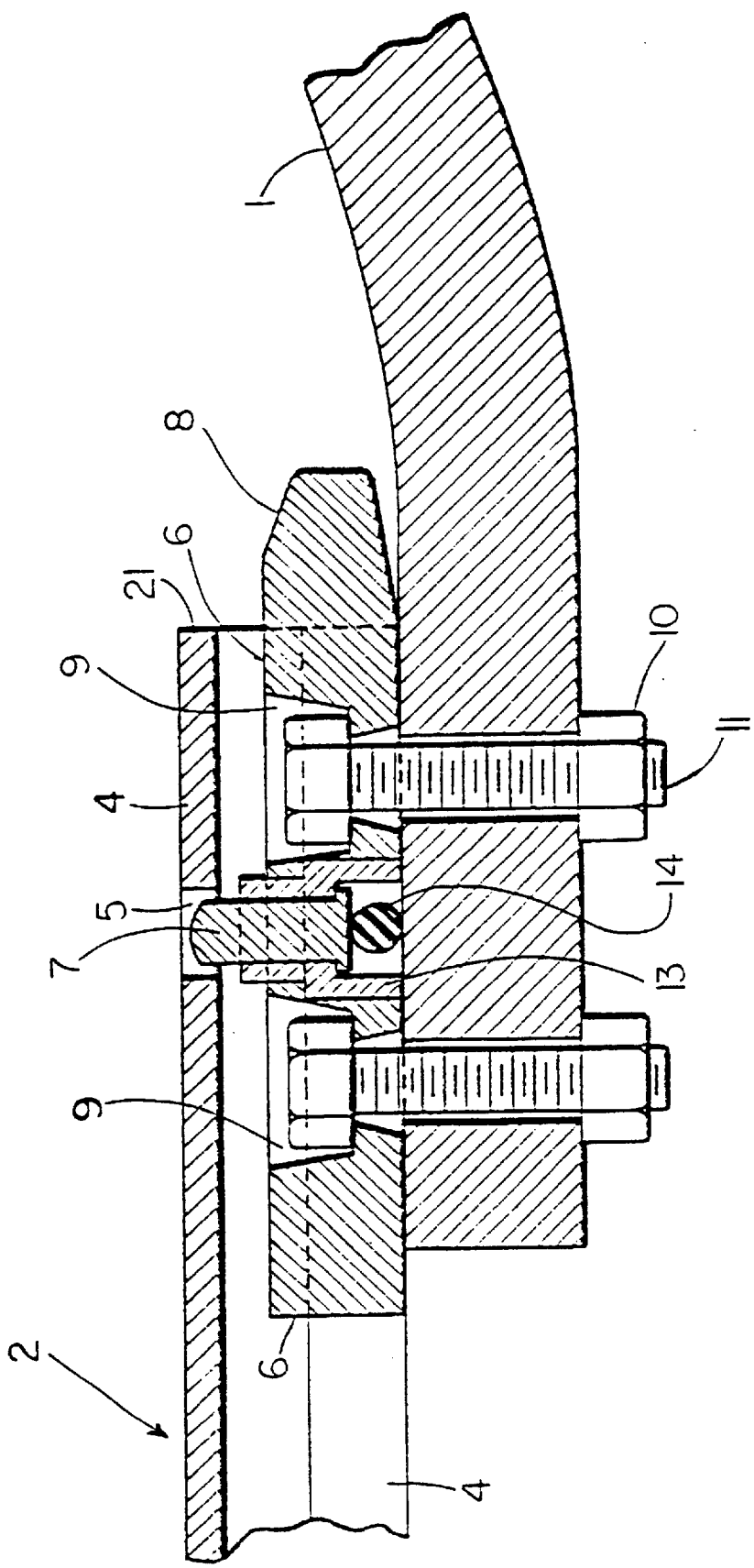
FIG. 4 is an enlarged fragmentary cross section of the components of the present invention.

The securement of the resilient ball (14) under the detent (7) within filler plug (13) is evident in FIG. 4. One also notes how the bolts (11) are recessed within the adapter and only the detent (7) extends upwardly into aperture (5) of soil opener (2).

Figures 5A, 5B:
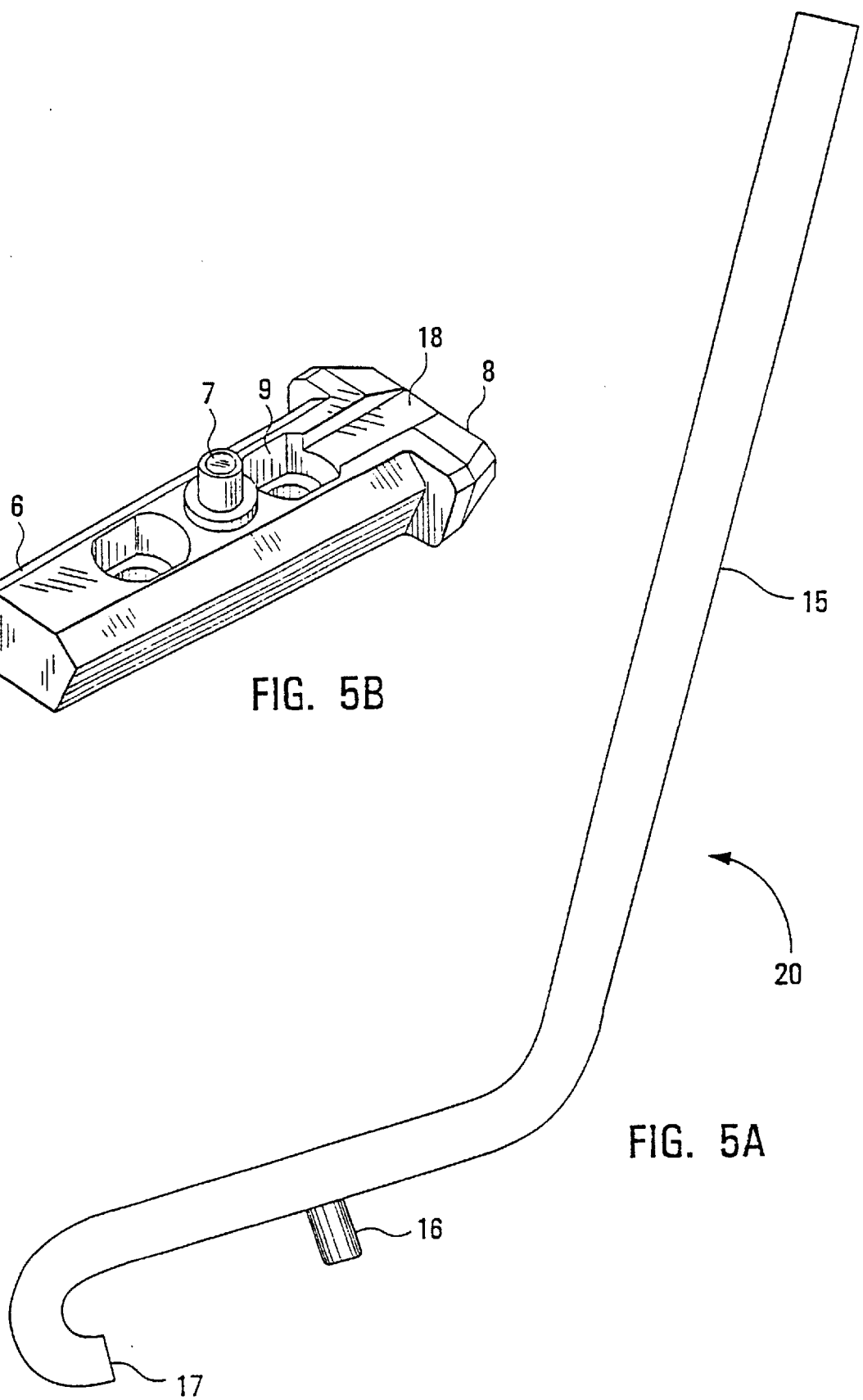
FIG. 5A is a side view of a removal tool.
FIG. 5B is a perspective view of a second embodiment of the adapter of the present inventions.
Figure 5C:
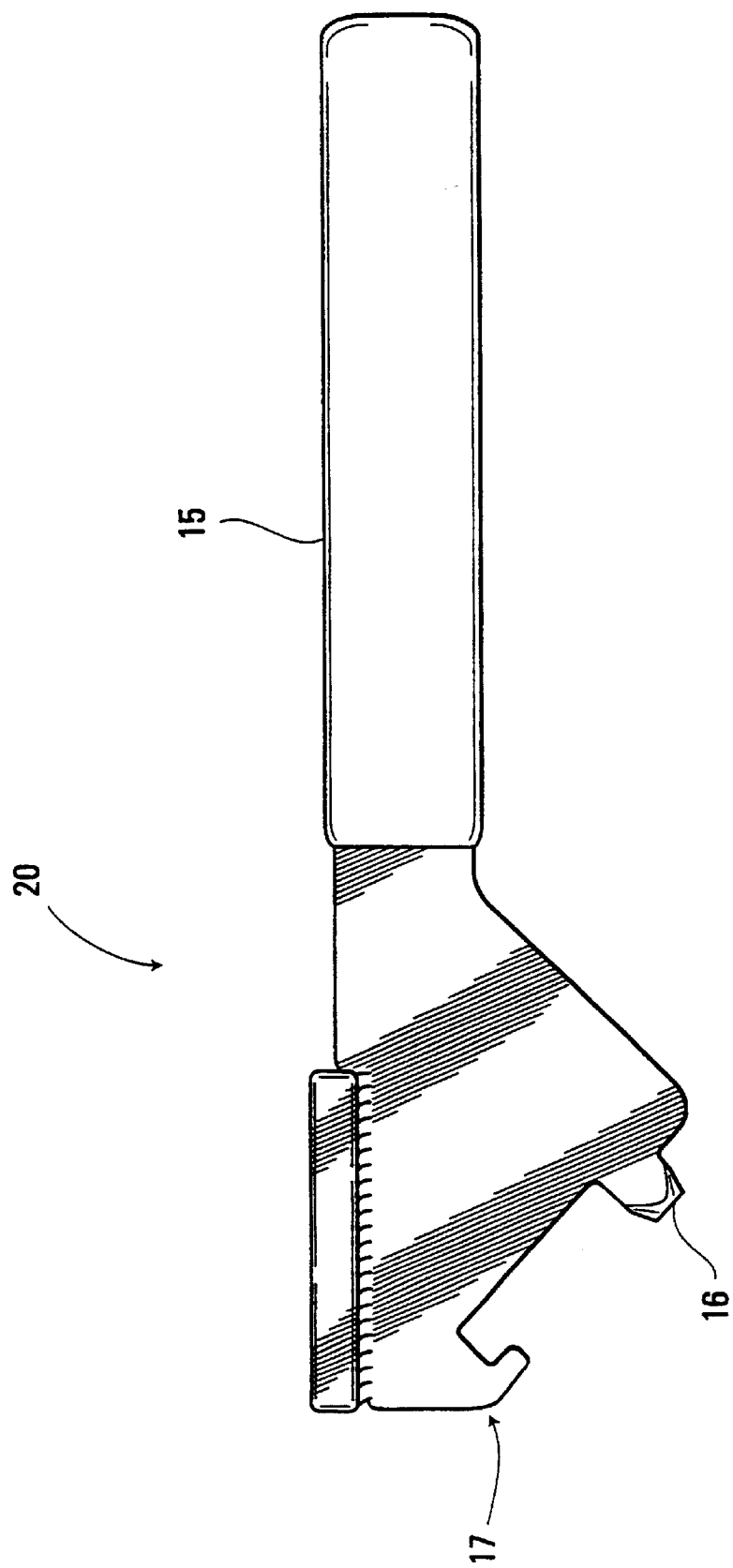
FIG. 5C is a side view of an alternative removal tool.

FIGS. 5A and 5C show side views of the removal tool (20) useful for detatching the soil opener (2) from the adapter shank (6). Tool (20) has an elongate handle (15), a detent press protrusion (16) and an engagement end (17). In use, the removal tool (20) is oriented such that the engagement end (17) abuts the end (21) (FIG. 4) of the holder (4), with the press protrusion (16) extending above the detent (7) and the tool (20) being oriented longitudinally of the holder (4), as viewed in FIG. 4 with the handle (15) extending upwardly to the left. The spacing between the protrusion (16) and the engagement end (17) corresponds to the spacing between the end surface (21) and the detent (17) when the soil opener is mounted as seen in FIG. 4. Accordingly by pivoting the tool (20) about its engagement (17) the detent (7) is depressed by the protrusion (16) below the edges of the aperture (5) as seen in FIG. 4 so that the holder (14) is unblocked and can be moved (to the left as seen in FIG. 4) out of engagement of with the adapter shank (6). It will be understood that in the event of the holder (4) binding on the adapter shank (6), the disengagement movement can be assisted by impacting the engagement end (17), or if a stronger force is required, by one or more hammer blows applied to the curved portion of the tool (20) adjacent the end (17). It will be appreciated that because of the tapered configuration of the shank (6) and the holder (4), a very slight longitudinal relative movement will be sufficient to completely free these parts from engagement.

The removal tool is particulary effective when used with the second embodiment of the invention shown in FIG. 5B. There, the adapter shank (6) and head (8) are equipped with a slot (18) on the top face thereof which extends from the top of head (8) to the top of the adjacent bolt aperture (9). This slot (18) has a width sized to receive the engagement end (17) of the tool (20), guide it into engagement with the end (21) of the holder (4), and reduce the possibility of the end (17) accidentally disengaging during manipulation of the tool (20) in detaching the soil opener from its mounting.

It is to be understood that the present invention is not limited to the specific embodiments shown, but is more specifically set out in the subsequent claims.

The embodiments of the invention in which an exclusive property or privilege is claimed are defined as follows:

1. A quick change soil working assembly adapted for use with an agricultural soil working implement;
   said assembly comprising an adapter and a soil working tool;
   said adapter being configured to be fixedly attached in operation to a mounting shank on said implement;
   said adapter including a shank and a head;
   said adapter shank having a cross-section adapted to matingly engage said soil working tool;
   said adapter shank including a pair of a bolt apertures, a detent aperture, and a resiliently biased detent assembly;
   said detent assembly including a resilient means, a detent aperture filler plug, and a detent;
   said soil working tool, including a soil working portion and an elongate holder;
   said holder including a pair of side flanges with an inner cross section adapted in operation to matingly engage said adapter shank;
   said holder further including a detent receiving aperture;
   whereby, in operation, when said holder is moved longitudinally onto a mounted position on said adapter shank, said detent means registers with said aperture whereupon said resilient means moves said detent into said detent receiving aperture to lock said soil working tool in place;
   and when said detent is pressed downwardly said holder may be moved longitudinally of said adapter shaft to detach said soil working tool.

2. A quick change soil working assembly as claimed in claim 1 wherein said resilient means is a resilient ball.

3. A quick change soil working assembly as claimed in claim 2 wherein said adapter shank has a profile that tapers away from said head, said elongate holder having a longitudinal taper that matches the taper of said adapter shank;
   said adapter head having at least one lateral projection that is positioned to engage an abutment surface on said holder when the holder lays in said mounted position.

4. A quick change soil working assembly as claimed in claim 1 wherein said adapter shank is six sided;
   said shank having a flat bottom side, a flat top side, two downwardly and outwardly tapered upper sides and two upwardly and outwardly tapered lower sides.

5. A quick change soil working assembly as claimed in claim 4 wherein said two side flanges of said holder of said soil working tool have a common inner top wall and each of said flanges has an upper downwardly and outwardly tapered inner side wall and a lower downwardly and inwardly tapered inner side wall;
   said inner walls being adapted to matingly engage said two upper tapered side walls and said two lower tapered side walls of said adapter shank.

6. A quick change soil working assembly as claimed in claim 5 wherein said adapter shank has a profile that tapers away from said head, said elongate holder having a longitudinal taper that matches the taper of said adapter shank;
   said adapter head having at least one lateral projection that is positioned to engage an abutment surface on said holder when the holder lays in said mounted position.

7. A quick change soil working assembly as claimed in claim 4 wherein said adapter shank has a profile that tapers away from said head, said elongate holder having a longitudinal taper that matches the taper of said adapter shank;
   said adapter head having at least one lateral projection that is positioned to engage an abutment surface on said holder when the holder lays in said mounted position.

8. A quick change soil working assembly as claimed in claim 1 wherein said adapter further includes a longitudinal recess on the top side thereof;
   said recess extending from an upper bolt aperture in said adapter shank to a free end of said adapter head.

9. A quick change soil working assembly as claimed in claim 8 further comprising a soil working tool removal instrument;
   said instrument including an elongate shank handle, a detent press protrusion, and a slot engagement curved end;
   said slot engagement curved end, in operation, being adapted to fit into said longitudinal recess in said adapter and said detent press protrusion being adapted to press downwardly on said detent, thereby releasing said soil working tool from said adapter.

10. A quick change soil working assembly as claimed in claim 9 wherein said adapter shank has a profile that tapers away from said head, said elongate holder having a longitudinal taper that matches the taper of said adapter shank;
    said adapter head having at least one lateral projection that is positioned to engage an abutment surface on said holder when the holder lays in said mounted position.

11. A quick change soil working assembly as claimed in claim 8 wherein said adapter shank has a profile that tapers away from said head, said elongate holder having a longitudinal taper that matches the taper of said adapter shank;
    said adapter head having at least one lateral projection that is positioned to engage an abutment surface on said holder when the holder lays in said mounted position.

12. A quick change soil working assembly as claimed in claim 1 wherein said head of said adapter includes a pair of lateral projections;
    said projections in operation being adapted to act as a limiting stop when said holder is moved upwardly on said adapter shank.

13. A quick change soil working assembly as claimed in claim 1 wherein said adapter shank has a profile that tapers away from said head, said elongate holder having a longitudinal taper that matches the taper of said adapter shank;
    said adapter head having at least one lateral projection that is positioned to engage an abutment surface on said holder when the holder lays in said mounted position.

* * * * *